United States Patent [19]

Iwase et al.

[11] 4,132,636
[45] Jan. 2, 1979

[54] METHOD FOR TREATING GAS LIQUOR

[75] Inventors: Toshio Iwase, Kasukabe; Teruo Hashimoto; Youko Iguchi, both of Tokyo, all of Japan

[73] Assignee: Niigata Engineering Co., Ltd., Tokyo, Japan

[21] Appl. No.: 855,504

[22] Filed: Nov. 28, 1977

[30] Foreign Application Priority Data

Aug. 24, 1977 [JP] Japan .................. 52-101415

[51] Int. Cl.² .................. C02C 1/04; C02C 5/04
[52] U.S. Cl. .......................... 210/6; 210/17; 210/18; 210/51
[58] Field of Search .............. 210/3, 6, 12, 14, 17, 210/18, 32, 40, 49, 50, 51

[56] References Cited

U.S. PATENT DOCUMENTS

| 3,824,185 | 7/1974 | Caldwell et al. | 210/3 |
| 3,847,807 | 11/1974 | Herman et al. | 210/51 X |
| 3,977,966 | 8/1976 | Pradt et al. | 210/17 |
| 3,980,556 | 9/1976 | Besik | 210/6 |
| 4,009,098 | 2/1977 | Jeris | 210/3 |
| 4,069,148 | 1/1978 | Hutton et al. | 210/18 X |
| 4,073,722 | 2/1978 | Grutsch et al. | 210/6 X |
| 4,076,615 | 2/1978 | Olesen et al. | 210/6 X |

Primary Examiner—Thomas G. Wyse
Attorney, Agent, or Firm—Sughrue, Rothwell, Mion, Zinn and Macpeak

[57] ABSTRACT

A method for treating a gas liquor to remove polluting substances with a stable treating efficiency and at a high rate which comprises the steps of
(A) pre-treating a gas liquor discharged from a quenching of coke oven gas, the gas liquor containing ammonia, phenols, thiocyanate compounds, cyanide compounds, suspended solids and oils, to reduce the ammonia content of the gas liquor to about 1,000 ppm or less;
(B) subjecting the gas liquor from step (A) to a first biological treatment comprising treating the gas liquor treated in step (A) with microorganisms,
(C) subjecting the gas liquor from step (B) to a second biological treatment comprising treating the gas liquor treated in step (B) in an aerating tank including a mixture of suspended solids comprising powdered activated carbon and activated sludge mixed with the gas liquor, and
(D) adding an iron salt to the gas liquor from step (C) to cause coagulation and sedimentation.

16 Claims, 1 Drawing Figure

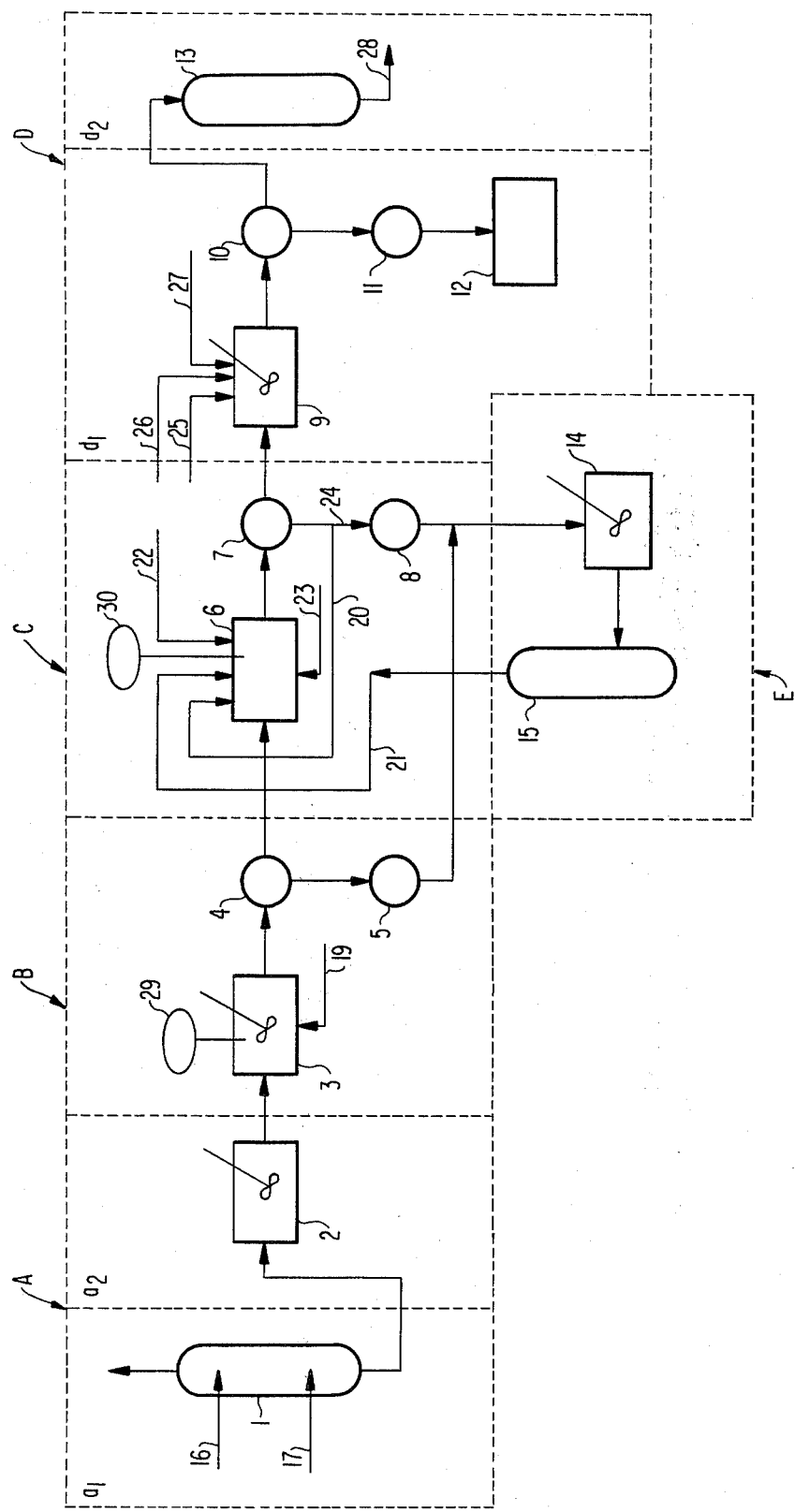

METHOD FOR TREATING GAS LIQUOR

BACKGROUND OF THE INVENTION

1. Field of the Invention

This invention relates to a method for treating a gas liquor discharged from the quenching of coke oven gas in the industrial manufacture of coke or coke oven gas to remove therefrom polluting substances such as ammonia, phenols, thiocyanide compounds, cyanide compounds, suspended solids, and oils.

2. Description of the Prior Art

As is well known, gases discharged from a coke oven in plants for manufacturing coke or coke oven gas are quenched, i.e., cooled, using primary coolers whereby water vapor, tarry substances, ammonia, etc. in the gases are condensed and discharged as a condensed liquid. The condensed liquid is separated by a tar decanter into crude tar and gas liquor, and the gases are separately sent to a treating step. The gas liquor contains various noxious substances and impure substances as shown in Table 1 below, and therefore, its treatment poses a problem when such is to be discarded.

Table 1

| | | | Analysis Method |
|---|---|---|---|
| 1. | pH | 8.5–9.5 | JIS K-0102 |
| 2. | $COD_{Mn}$ | 2,500–7,500 ppm | JIS K-0102 - $_{1974}$ 14 |
| 3. | $COD_{Cr}$ | 3,300–9,500 ppm | ASTM D-1252 - $_{1974}$ |
| 4. | $BOD_5$ | 1,500–4,000 ppm | JIS K-0102 - $_{1974}$ 16 |
| 5. | Phenols | 700–1,700 ppm | JIS K-0102 - $_{1974}$ 20.1 and 20.2 |
| 6. | Thiocyanates | 150–800 ppm | Nitric acid decomposition method (as SCN) |
| 7. | Cyanides | 15–100 ppm | JIS K-0102 - $_{1974}$ 29.1.2 (as CN) |
| 8. | $NH_3$ | 3,000–4,000 ppm | JIS K-0102 - $_{1974}$ 17.1.3 (as N) |
| 9. | Suspended solids | 50–100 ppm | JIS K-0102 - $_{1974}$ 10.2.1 (as N) |
| 10. | Oils | 100–200 ppm | JIS K-0102 - $_{1974}$ 18.2 (as N) |

In Table 1, $COD_{Mn}$ is the chemical oxygen demand of polluting substances in gas liquor which is measured using potassium permanganate; $COD_{Cr}$ is the chemical oxygen demand of the polluting substances which is measured using potassium dichromate; and $BOD_5$ is the bilogical oxygen demand of the polluting substances in gas liquor for a period of 5 days at 20° C.

The pH of an aqueous liquid containing thiocyanate compounds is adjusted to 1 to 2 with sulfuric acid. Cyanide compounds in the liquid are removed from the thus-obtained liquor by passing through a gas or by distillation. Then thiocyanate compounds in the liquid are decomposed with, e.g., $HNO_3$ to cyanide compounds and the amount of the cyanide compounds can be determined by, for example, method prescribed in JIS K 0102-$_{1974}$ 29.1.2.

Phenols present include phenol, o-, m- and p-cresols, 3,5-xylenol, α- and β-naphthols, oxine, catechol, pyrogallol, metal salts (e.g., Na, K, Ca, Ba or Al salts) of these phenols, phenolcarboxylic acids such as salicylic acid and benzoic acids (m- and p-), and the esters and ethers of mono-, di-, and tri-hydric phenols.

Thiocyanate compounds present include thiocyanic acid (including isothiocyanic acid), ammonium salts of these acids, metal salts (e.g., Na or Fe salts) of these acids, and phenyl thiocyanate.

Cyanide compounds present include $M(CN)_{1\ or\ 2}$ (where M is H, K, Na, Cu, Zn, Cd, etc.), XCN (where X is F, Cl, I, Br), RCN (where R is alkyl or aryl), and cyano complexes containing Ni, Fe, Cr, Mn, Cu, Hg, Cd, etc. (e.g., as disclosed in *Encyclopedia Chimica*, Vol. 7, p. 727, 19th Edition, published on Sept. 10, 1976 by Kyoritsu Shuppan, Tokyo).

The suspended solids present are insoluble inorganic or organic compounds such as carbon in the coal, corrosion products of the equipment (for example, $Fe_2O_3$), naphthalene, and sulfur.

Oils present include coal tar, pyridine, etc.

One conventional method for treating gas liquor comprises diluting the gas liquor to 2 to 4 times with industrial water or sea water, and subjecting the diluted gas liquor to an activated sludge treatment and a post-treatment (coagulation and sedimentation of cyanide ion and an adsorption treatment using granular activated carbon) [see, for example, W. G. Gousins and A. B. Mindler, J. Water Pollution Federation, Vol. 44, No. 4, 607(1972); Paul D. Kostenbader and John W. Flecksteiner, *J. Water Pollution Federation*, Vol. 41, No. 2, 199(1969)]. According to this type of treatment, the treating efficiency in an activated sludge treatment device fluctuates greatly, and a stable treating performance with a high efficiency cannot be obtained. Accordingly, such a method cannot meet rigorous legislative environmental pollution standards. Moreover, the method which involves the dilution of gas liquor with industrial water is actually difficult to employ since industrial water is scarce nowadays. It has been desired, therefore, to establish a method for treating gas liquor stably at a high efficiency without the need for a dilution step.

SUMMARY OF THE INVENTION

An object of this invention is to provide a method for removing polluting substances from gas liquor.

Another object of this invention is to provide a method for removing polluting substances from gas liquor steadily and with good efficiency without diluting the gas liquor.

Still another object of this invention is to provide a method for removing polluting substances from gas liquor to such an extent that no pollution of the environment upon discharge occurs.

The present invention provides a method for treating gas liquor, which comprises the steps of (A) treating a gas liquor discharge from the quenching of coke oven gas, the gas liquor containing ammonia, phenols, thiocyanate compounds, cyanide compounds, suspended solids and oils, to reduce the ammonia content of the gas liquor to about 1,000 ppm or less;

(B) subjecting the gas liquor from step (A) to a first biological treatment comprising decomposition, oxidation or decomposition-oxidation with microorganisms;

(C) subjecting the gas liquor from step (B) to a second biological treatment comprising decomposition, oxidation or decomposition-oxidation treatment with microorganisms and to an adsorbing treatment with activated carbon in an aeration tank including a mixture of suspended solids comprising powdered activated carbon and activated sludge mixed with the gas liquor: and (D) adding an iron salt to the gas liquor from step (C) to cause coagulation and sedimentation.

BRIEF DESCRIPTION OF THE ACCOMPANYING DRAWING

The drawing is a flowsheet illustrating an embodiment of the method of this invention.

DETAILED DESCRIPTION OF THE INVENTION

Step (A) of the method of this invention achieves the removal of ammonia which is a major inhibiting factor in the decomposition or oxidation reaction of the polluting substances by microorganisms. In step (B), phenols, suspended solids and oils are removed to reduce the BOD and COD ascribable mainly to the phenols. In step (C), the phenols, thiocyanate compounds, suspended solids and oils are removed to reduce the COD and BOD further. In step (D), the cyanide compounds, suspended solids and oils are removed to reduce the COD and BOD of the gas liquor to extremely small values.

In step (A), the reduction in the ammonia content, i.e., a stripping of the ammonia is performed generally by blowing air or steam into the gas liquor. The amount of ammonia removed in this step should preferably be as large as possible, but preferably a part of the ammonia is left for use as a nitrogen source in the microbiological treatments. The optimum amount of ammonia to be left for this purpose is about 50 to about 200 ppm. In this case, stripping should be performed after adjusting the pH of the gas liquor to about 10 to about 11 by adding an alkali such as sodium hydroxide (usually in the form of a concentrated aqueous solution of the alkali). Generally, however, it is sufficient for the ammonia to be removed such that the residual amount of ammonia becomes about 800 to 1,000 ppm. At this level, there is no need to add the alkali. KOH, $CaCO_3$ and $Ca(OH)_2$ can also be used as the alkali. But the use of $CaCO_3$ or $Ca(OH)_2$ is less preferred because a scale may be formed.

The ammonia stripping is generally performed at atmospheric pressure. Further, the efficiency of the stripping is better at high temperatures. Generally, the temperature used for ammonia stripping is about 60 to about 100° C., preferably 90 to 100° C. and the air or steam is simply passed through the gas liquor until the ammonia concentration is reduced to the extent described above.

The pH of the gas liquor left after removal of the ammonia is adjusted to pH values suitable for microbiological treatment, i.e., a pH about 5 to about 8 preferably 5.5 to 7.5. This pH adjustment is carried out generally by adding e.g., sulfuric acid of a concentration of about 10 to 80% by weight. Hydrochloric acid, nitric acid, and phosphoric acid can also be used for neutralization, but sulfuric acid is most preferred.

The gas liquor whose pH has been adjusted is then subjected to a first biological treatment step (B) using microorganisms, i.e. a biological activated sludge e.g., as described in, for example, Japenese Patent Applications (OPI) No. 5949/69. Suitable sources of activated sludge include excess sludge exhausted from treatment of domestic waste water or, preferably, gas liquor. This step can be performed using a suspension process such as an activated sludge method, or a fixed bed method such as a rotating disc method [e.g., as disclosed in F. Pöpel, "Leistung, Berechung und Gestulung von Tauchtropfkörperanlager" *Stuttgarter Berichte zur Siedlungswasserwirtschaft* Stuttgart (1964)], and a contact oxidation method (a submerged filter method, a tube method) [e.g., as disclosed in Sadao Kojima, *Collection of Informative Materials for Techniques of Producing and Utilizing Regenerated Water*, Fuji Technosystem Press (1974)]. However, since the concentration of organic matter of the influent gas liquor is high, it is preferred to employ a contact oxidation method using an aeration tank filled with a synthetic resin filling material which is resistant to variations in load.

The filling material for the aeration tank used in the contact oxidation method may be a non-woven sheet having a three-dimensional network structure with irregularly interlaced fibers which is obtained by curling synthetic fibers such as those of nylon, polyvinylidene chloride or polyvinyl chloride by, for example, heat treatment, arranging the curled fibers in the form of a web or a mat, and bonding these fibers into a sheet form using a bonding agent or using a melt-adhesion of the fibers themselves by heat treatment, or a foamed synthetic resin sheet formed by foaming a synthetic resin such as polyurethane or polystyrene.

Generally, such filling materials having a thickness of about 20 to about 40 mm are aligned in parallel to one another at intervals of about 20 to about 50 mm, and a large number of aerobic, facultative and anaerobic microorganisms are held and grown on the surfaces of the filling materials and in spaces in the interior thereof.

Suitable filling materials which can be used include those non-woven sheets described in U.S. patent application Ser. No. 836,921, filed Sept. 26, 1977 (corresponding to Japanese patent application No. 114457/1976; Attorneys Docket No. Q6697) and foamed synthetic resin sheets as disclosed in Japanese patent application (OPI) No. 64261/1974.

The pH inside the aeration tank in the first biological treatment step is adjusted e.g., as described above, usually to about 6.0 to about 7.5. Depending on the character of the gas liquor, the pH of the gas liquor can be adjusted to the most suitable value experimentally. The pH adjustment may be performed prior to the introduction of the gas liquor into the aeration tank. Alternatively, the pH of the gas liquor may be roughly adjusted before introduction into the tank, and then adjusted in the tank within a smaller pH range, hereinafter microadjusted, by automatic control.

In the suspension process, the activated sludge concentration in the aeration tank is usually about 2000 to about 5000 ppm, preferably 3000 to 4000 ppm. The temperature is usually about 20 to about 40° C., preferably 25 to 35° C. Air is introduced into the tank so that the amount of dissolved oxygen becomes usually about 1 to about 5 ppm, preferably 3 to 4 ppm.

In the contact oxidation method in the fixed bed system, the treatment is performed at a volume load of about 4 to about 8 kg $COD_{Mn}/m^3$ day, preferably 5 to 7 kg $COD_{Mn}/m^3$ day and a surface area load of about 200 to about 400 g $COD_{Mn}/m^2$ day, preferably 250 to 400 g/$m^2$ day. The temperature and the pH may be the same as those used in the suspension process. The amount of dissolved oxygen is about 2 to about 7 ppm, preferably 4 to 6 ppm.

In step (B), phenols and other polluting materials are removed due to the action of microorganisms. Preferably, the polluting substances are removed in this step to an extent that the $COD_{Mn}$ is reduced by the 30%, so as to reduce the loads in the subsequent treatment with activated carbon and activated sludge and to perform the treatment in a stable manner and with good efficiency. Removal of the polluting substances to reduce the $COD_{Mn}$ to more than about 90% is not preferred for operation. If the amounts of the polluting substances to be removed are small and the BOD and $COD_{Mn}$ are high, the amount of sludge generated in the second biological treatment step increases, and this is undesirable from the standpoint of equipment cost, treating efficiency, and treating effect. If, on the other hand, the rate of removal of the polluting substances is large and the reduction of the $COD_{Mn}$ is more than about 90%, the amount of sludge generated in the second biological treatment step is small. Thus, the rate of addition of activated carbon is restricted depending upon the absolute amount of excess sludge (activated sludge/activated carbon mixture weight ratio). Hence, this is not preferred in the method of this invention. In order to maintain a fixed rate of addition of activated carbon and keep the concentration of activated carbon in the aeration tank at a fixed value, the amount of excess sludge generated should be within a certain fixed range. When the amount of excess sludge is too large, a large amount of activated sludge must be discharged from the system in order to maintain the concentration of activated sludge in the aeration tank at the desired value. As a result, the amount of activated carbon in the excess sludge is withdrawn in an amount larger than the desired amount, and in order to maintain the concentration of activated carbon in the aeration tank at the desired value, the addition of more activated carbon becomes necessary. If, on the other hand, the amount of excess sludge generated is too small, only a small amount of activated sludge can be withdrawn in order to maintain the activated sludge concentration in the aeration tank constant. If a fixed rate of addition of activated carbon is maintained in such a situation, the amount of activated carbon in the aeration tank increases. Furthermore, in order to maintain the amount of activated carbon at the fixed value in the aeration tank, the rate of addition of activated carbon should be reduced. A decrease in the rate of addition of activated carbon deteriorates the properties of the liquor being treated.

In step (C), the excess sludge is treated with a device for regenerating activated carbon by, for example, the wet air oxidation method [e.g., as disclosed in U.S. Pat. No. 3,442,798, and W. J. Burant et al. *Water and Sewage Works*, Vol. 120, No. 11, P. 42 (1973)], the multiple hearth furnace method [e.g., as disclosed in A. W. Woven, *Chemical Engineering Progress*, Vol. 69, No. 11, P. 56 (1973)], the transport reactor method [e.g., as disclosed in S. B. Smith, *Chemical Engineering Progress*, Vol. 71, No. 5, p. 89, (1975)], and the fluidized bed furnace method [e.g., as disclosed in B. L. Berg, *Chemical Engineering Progress, Symp. Ser.* Vol. 69, No. 107, p. 154 (1970)]. The sludge is oxidized and burned, and the activated carbon is activated and regenerated for reuse. Fresh activated carbon is supplied in an amount corresponding to the loss during regeneration (which is about 4 to about 7%).

In order to add a predetermined amount of activated carbon while maintaining the composition of the activated carbon/activated sludge mixture weight ratio constant, the degree of decrease of $COD_{Mn}$ in step (B) is preferably about 30 to about 90%, more preferably 50 to 80 %.

The residence time of the liquor being treated in the treating tank is generally about 10 to about 15 hours when the amount of sludge returned is 100% by volume based on the volume of the starting liquor.

The gas liquor treated in step (B) is subjected to a solid-liquid separation (e.g., by sedimentation), and the supernatant liquid is then subjected to step (C). In step (C), phenols and thiocyanate compounds etc. in the gas liquor are removed by the decomposition, oxidation or decomposition-oxidation action of the microorganisms in the activated sludge and the adsorption action of the activated carbon. Hence, the BOD and COD are reduced. In this step, activated sludge and activated carbon make up the mixture of the liquor and suspended solids in the aeration tank.

The activated carbon used in this invention can be one derived from a coal base, a wood base (for example, coconut shells, etc.) and a petroleum base and has a particle size of usually about 150 to about 400 mesh, preferably 200 to 250 mesh. Activated carbon having too small a particle size is difficult to separate in the solid-liquid separating procedure, and an activated carbon having too large a particle size has poor adsorbability and it is difficult to achieve good circulation within the tank.

The concentration of activated sludge in the aeration tank is usually about 2500 to about 5000 mg/liter, preferably 3000 to 4000 mg/liter. The activated carbon concentration is usually about 10,000 to about 50,000 mg/liter, preferably 20,000 to 40,000 mg/liter. The ratio by weight of the activated sludge to the activated carbon is about 1 : 2 to about 1 : 20, preferably 1 : 5 to 1 : 14. If the amount of activated carbon is less than about 10,000 mg/liter, the amounts of the polluting substances, the decomposition products and the oxidation products to be adsorbed decrease. If the amount of activated carbon is larger than about 50,000 mg/liter, it is difficult to separate the activated carbon with good efficiency in the solid-liquid separating operation.

The treatment in this step is carried out usually at about 20 to about 40° C., preferably 25 to 35° C. The amount of air fed into the tank is adjusted such that the amount of dissolved oxygen in the tank is usually about 2 to about 6 ppm, preferably 3 to 4 ppm. The pH inside in the aeration tank is usually adjusted to about 6 to about 7.5 by automatic control. The pH can be adjusted to the most suitable range experimentally depending on the character of the gas liquor. The pH of the liquor can be adjusted with an inorganic acid such as sulfuric acid, hydrochloric acid, nitric acid and phosphoric acid but sulfuric acid is preferred. In order to keep the weight ratio of the activated sludge and activated carbon constant, the activated carbon is added to the aeration tank in an amount of about 500 to about 2,000 mg/liter based on the liquor introduced. Regenerated activated carbon can be used for this purpose. The loss (which is about 4 to about 7%) of the activated carbon at the time of regeneration is replenished with fresh activated carbon. The residence time of the liquor in the aeration tank is usually about 8 to about 15 hours.

By mixing activated sludge and activated carbon in the step described above, an anaerobic zone is formed around the activated carbon, and an aerobic zone, on the outside of the anaerobic zone. Substances adsorbed on the activated carbon are decomposed by anaerobic microorganisms, and oxidized by aerobic microorganisms. Since the polluting substances are adsorbed on the activated carbon, the load of sludge and qualitative and quantitative shock loads (i.e., resistance to variations in load) can be reduced, and the treating efficiency can be stabilized. Furthermore, the reactions within the system are promoted because the biological metabolites in the treating system are adsorbed.

The activated sludge-activated carbon mixture is separated and removed from the gas liquor treated in step (C), and the residue is subjected to step (D). The coagulation and sedimentation in step (D) are carried out by adding an iron salt to the gas liquor. Any water-soluble iron salts can be used for this purpose. Examples of suitable iron salts are iron chlorides and iron sulfates.

Specific examples of coagulation and sedimentation methods using iron salts are given below.

(1) A ferric salt is added to the gas liquor, and the pH of the gas liquor is adjusted using an alkali such as sodium hydroxide or potassium hydroxide. This results in a change in cyanide ion in the gas liquor to insoluble Berlin blue (i.e., iron (III) hexacyanoferrate (II), for example, $Fe^{III}[Fe^{III}Fe^{II}(CN)_6]_3$) which is coagulated and sedimentated together with the $Fe(OH)_3$ which is formed simultaneously. The pH adjustment may be performed before or after adding the iron salt to the gas liquor.

Usually, $FeCl_3$ and $Fe_2(SO_4)_3$ are used as ferric salts. but the hydrates thereof and salts thereof (e.g., $FeCl_3.6H_2O$, $Fe(SO_4)_3.nH_2O$ (where n is 0, 3, 6, 7, 7.5, 9, 10 and 12), $KFe(SO_4)_2.12H_2O$ and $NH_4Fe(SO_4)_2.12H_2O$) as well as $Fe(NO_3)_3.9H_2O$ can be used. The ferric salt is employed in an amount of about 600 to about 800 ppm (as $Fe^{III}$) to reduce the amount of cyanide ion in the gas liquor, for example, from 3 ppm to 1 ppm. As the amount of cyanide ion is increased, the amount of ferric salt must be increased. The ratio of increase of the ferric salt may be smaller than the ratio of increase of the cyanide ion. In other words, as the concentration of cyanide ion decreases, the ratio of the iron salt to the cyanide ion should be higher. The pH is adjusted usually to about 5 to about 7, preferably 5.5 to 6.5. The reaction temperature is usually about 15 to about 25° C.

(2) A ferrous salt is added to the gas liquor to convert the cyanide ion in the gas liquor to a precipitate of ferrous ferrocyanide and insoluble Turnbull's blue (for example $KFe^{II}[Fe^{III}Fe^{II}(CN)_6]_3$). $FeCl_2$, $FeCl_2.4H_2O$, $FeSO_4.nH_2O$(where n is 0, 1, 4, 5, 7) and $(NH_4)_2SO_4.FeSO_4.6H_2O$ can be used as ferrous salts. The pH of the gas liquor is then adjusted to about 7.5 to about 9.5, preferably 8 to 9, using a alkai of the type described hereinabove. As a result, the precipitate of the insoluble Turnbull's blue changes to $Fe(OH)_2$, $Fe(OH)_3$ and $[Fe(CN)_6]^{4-}$. The $Fe^{2\times}$ remaining in the gas liquor is converted to $Fe(OH)_2$. The precipitate produced by adding a ferrous salt may be separated and removed from the gas liquor before adjustment of the pH of the gas liquor. Although the number of process steps is increased by separating and removing the precipitate, the amount of the alkali which is used can be reduced. The removal of the precipitate may not be done completely. When a ferric salt is added to this gas liquor, the $[Fe(CN)_6]^{4-}$ becomes insoluble Berlin blue.

Examples of the iron salts which can be used in this method are ferrous chloride, ferrous sulfate, ferric chloride and ferric sulfate. The amount of ferrous salt added is preferably such that the $Fe^{II}$ is the salt is within the range x' calculated using the following equations.

$$y = 0.213x - 3.8$$

$$x' = x \pm 25 \text{ mg/l}$$

y: the concentration in mg/liter of cyanide ion in the influent liquor, x: the amount of $Fe^{II}$ in mg/liter in the ferrous salt added.

The amount of ferric salt is used such that the $Fe^{III}/Fe^{II}$ weight ratio is about 0.5 : 1 to about 3 : 1, preferably 1 : 1 to 2 : 1.

The temperature used in this method is about 15 to about 25° C.

In the method of this invention, the use of method (2) described above is especially preferred.

The sediment of Berlin blue, Turnbull's blue, $Fe(OH)_2$ and $Fe(OH)_3$ is coagulated together and separated. The supernatant liquid is preferably filtered (for example, filtered through sand), and discharged.

By performing the biological treatment as a principle process in this invention in a multiple of stages (preferably at least two stages of the first biological treatment and one stage of the step of treatment using an activated sludge-activated carbon mixture), the variations in treating efficiency, which are the basic defect of biological treatments, can be reduced. Better results are obtained by repeating the first biological treatment step but balancing this with costs and expense, repetition 2 to 4 time is usually suitable.

Since the gas liquor flowing into the aeration tank contains polluting substances in high concentrations, it is necessary with ordinary methods to dilute the liquor to reduce the polluting substance concentration, or to aerate the liquor for long periods of time (for example, more than 36 hours). When the treatment is performed without diluting the liquor using the present invention, the treating efficiency can be stabilized by performing the treatment in a multiple of stages and thus to disperse the loads of the polluting substances in aeration tanks. The addition of activated carbon to activated sludge in this invention brings about an increased stability in the treating efficiency.

As a post-treatment step, the coagulating-sedimentation treatment using iron salts and the subsequent filtration are performed to remove the residual polluting substances such as cyanide compounds and suspended solids and to reduce the $COD_{Mn}$. According to the method of the present invention, gas liquor whose treatment with stabilized treating efficiency has been considered difficult can be treated completely with a stabilized treating efficiency using an effective combination of the pre-treatment step, the biological treatment steps, and the post-treatment step, thereby to obtain treated liquor for discharge of sufficient quality to meet environmental pollution standards. Furthermore, by the effective combination of the pre-treatment step, the two biological treatment steps and the post-treatment step, gas liquor can be treated easily and exactly without the need to dilute the gas liquor beforehand with industrial water (e.g., water from rivers, subterranean water and water obtained by treatment of sewage with activated sludge), sea water, waste water [e.g., household waste water (e.g., water or sewage exhausted from homes and factories and process waste water), and process waste waters (e.g., water used for washing in processing which has been treated to some extent)], or mixtures of these. Thus, the invention has provided a very effective method for treating gas liquor.

The present invention is described below by reference to one specific embodiment as shown in the accompanying drawing which is a flowsheet illustrating the treatment of gas liquor.

The process shown in the flowsheet comprises step (A) which can be considered a pretreatment step (an ammonia stripping step $a_1$ and a neutralization step $a_2$), a first biological treatment step (B) (treatment with microorganisms), a second biological treatment step (C) (treatment with a mixture of activated sludge and activated carbon), a post-treatment step (D) (a coagulating-sedimentation step $d_1$, and a final filtration step $d_2$) and an activated carbon regenerating step (E). The flow of gas liquor is shown by the boldface lines in the drawing. The activated carbon regeneration step (E) is an optional step.

First, gas liquor 16 is introduced into an ammonia stripper 1, and simultaneously, air or steam 17 is fed into the gas liquor 16 to remove ammonia 18 in the liquor. (ammonia stripping step A-$a_1$.)

Then, the gas liquor from which ammonia has been removed is introduced into a pH adjusting tank 2, and the pH of the gas liquor is adjusted to about 5 to about 8 e.g., with sulfuric acid. (neutralization step A-$a_2$.)

The gas liquor from which ammonia in a predetermined amount has been removed in the pre-treatment step and for which the pH has been adjusted in the same step is then introduced into a first biological treatment aeration tank 3. Air 19 is introduced into the aeration tank 3. Due to the decomposition and oxidation action of microoorganisms, the polluting substances in the gas liquor are partly removed. The pH of the liquor within the aeration tank 3 is adjusted using automatic pH controllers 29 and 30. When the above treating device is used with a fixed bed-type biological treating method, return sludge is in principle unnecessary. The gas liquor from which the polluting substances have been partly removed in the aeration tank 3 is then introduced into a settling tank 4 and the liquor is subjected to a solid-liquid separating procedure. The supernatant liquid is introduced into an aeration tank 6. The sludge is sent to an activated carbon reservoir tank 14 to be described hereinafter through a thickener 5, and the sludge is treated in an activated carbon regenerating device 15 with the pH being adjusted using controllers 29 and 30 simultaneously with the regeneration of the activated carbon (first biological treatment step B and regeneration step E.)

The supernatant liquid introduced into the aeration tank 6 from the settling tank 4 is mixed in the aeration tank 6 with activated sludge (including return sludge 20) and activated carbon (regenerated activated carbon 21 plus replenishing activated carbon 22). Air 23 is introduced into the aeration tank 6. Due to the biological oxidation action of the microorganisms in the activated sludge and the adsorption action of the activated carbon, phenols and thiocyanate compounds etc. in the gas liquor are removed, and the BOD and the COD are reduced. The regenerated activated carbon 21 may be activated carbon regenerated in the regeneration step E. The gas liquor treated in the aeration tank 6 is introduced into a settling tank 7 where the activated sludge-/activated carbon mixture is separated by sedimentation. The supernatant liquid is introduced into a coagulation tank 9. A part of the sludge (the activated sludge-/activated carbon mixture) is returned to the aeration tank 6 as return sludge 20. The remainder of the sludge is sent to a thickener 8 as excess sludge 24. (second biological treatment step C.)

A predetermined amount of a ferrous compound 25 such as ferrous chloride is added to the supernatant liquid introduced from the settling tank 7 into the coagulation tank 9, and, optionally, the mixture is stirred. Then, an alkali 26 such as sodium hydroxide or potassium hydroxide is added to adjust the pH of the mixture. Then, a predetermined amount of a ferric compound 27 such as ferric chloride is added. The mixture is stirred to remove the cyanide compounds from the gas liquor, and the COD is reduced. The treated liquid is subjected to a solid-liquid separating procedure in a settling tank 10. The supernatant liquid is introduced into a sand filtering device 13, and the sedimented sludge is supplied to a thickener 11.

The sedimented sludge is introduced into a sludge treating device 12 through the thickener 11, and separately treated. (coagulating sedimentation step D-$d_1$.) The supernatant liquid introduced into the sand filtering device 13 is completely filtered, and released as treated liquor 28. (final filtering step D-$d_2$.)

The sludge in the thickener 5 in the first biological treatment step B and the sludge (the activated sludge-/activated carbon mixture) in the thickener 8 in the second biological treatment step C are each transferred to the activated carbon reservoir 14 in the activated carbon regenerating step E, and are mixed in the activated carbon reservoir 14. The mixture is introduced into a equipment 15 for regenerating activated carbon using a wet air oxidation method. The used activated carbon is reactivated and regenerated, and the excess sludge is burned there. In the activated carbon regenerating step E, the regeneration of powdered activated carbon and the treatment of excess sludge are performed simultaneously. The activated carbon regenerated in the regenerating equipment 15 is returned to the aeration tank 6. In this way, the activated carbon is recycled, and the cost of treatment can be reduced. (regeneration step E.)

Since in the above step, the used activated carbon is regenerated and recycled, and at this time, since the excess sludge is also treated, the cost of treatment can be reduced. Thus, an economical treatment of gas liquor becomes possible.

The following Example and Comparative Example illustrate the present invention more specifically. However, the present invention is not to be construed as being limited by these examples. Unless otherwise indicated, all parts, percents, ratios and the like are by weight.

EXAMPLE

A gas liquor as shown in Table 3 below was treated under the conditions shown in Table 3 below using the process as shown in the flowsheet shown in the FIGURE. The biological treatment steps were performed continuously, and the pre-treatment and post-treatment steps were performed batchwise.

The biological treatment steps were performed as described below. The specifications of the test unit used are shown in Table 2.

Table 2

| Specifications of the Test Unit | | |
|---|---|---|
| | First Biological Step Fixed bed type biological treatment | Second Biological Step Treatment with activated sludge and activated carbon |
| Tank for Starting Liquor Raw Waste Storage Tank | 200 liters | — |
| Aeration Tank | 2.5 liters (2 tanks) | 10 liters |
| Settling Tank | 5 liters | 10 liters |
| Storage Tank | 50 liters | 50 liters |
| Pump for Supplying Starting Liquor | 0–30 ml/min. | 0–30 ml/min. |
| Pump for Returning Sludge | — | 0–30 ml/min. |

Table 2-continued

| | Specifications of the Test Unit | |
|---|---|---|
| | First Biological Step Fixed bed type biological treatment | Second Biological Step Treatment with activated sludge and activated carbon |
| Air Pump | 15 N liters/min. | 15 N liters/min. |
| Air Flow Meter | 0–5 N liter/min. (2 air flow meters) | 0–10 N liters/min. |
| Surface Area of Filling Material | 0.11 m$^2$ | — |
| Material of Filling Material | Polyvinylidene chloride non-woven sheet | — |

The gas liquor which had been subjected to the pretreatment step (ammonia stripping and neutralization with sodium hydroxide) was fed into the aeration tank of the first biological treatment step at a flow rate of 12 liters/day. Air was introduced into the aeration tank at a flow rate of 2 to 4 N liters/min. The amount of dissolved oxygen was maintained at 3 to 6 ppm, and the pH of the liquor in the aeration tank was maintained at 6 to 7 using an automatic pH adjuster. While the gas liquor was present in the aeration tanks (two tanks each with a capacity of 2.5 liters) for 10 hours, the gas liquor underwent the decomposition and oxidation actions of aerobic, facultative, and anaerobic microorganisms held and grown on the surface of the filling material and the interior spaces inside the filling material. As a result, the $COD_{Mn}$ was reduced by about 60%.

Air was fed into the aeration tank of the second biological treatment step at a flow rate of 2 to 3 N liters/min., and the amount of dissolved oxygen was maintained at 2 to 4 ppm. The pH of the liquor in the aeration tank was maintained at 6 to 7 using an automatic pH adjuster. The concentrations of the activated sludge and activated carbon in the aeration tank were 4100 and 39,000 ppm, respectively. The weight ratio of the activated sludge to the activated carbon was 1:9.5. The rate of addition of regenerated activated carbon was 1520 ppm and fresh activated carbon was 80 ppm based on the raw waste. While the gas liquor was present in the aeration tanks for 12 hours, the gas liquor was purified and clarified by the synergistic combination of the biological oxidation action by the activated sludge and the physical adsorbing action by the activated carbon. The amount of return sludge was 100% by volume based on the amount of the starting liquor fed.

In the coagulating and sedimenting step, 200 ppm of ferrous chloride was added to the treated liquor of the second biological treatment step and the mixture was rapidly stirred at 150 rpm for 2 minutes, and then sodium hydroxide was added to adjust the pH of the mixture to 8.5. Then, 100 ppm of ferric chloride was added, and the mixture was rapidly stirred at 15 rpm for 2 minutes, and then slowly stirred at 30 rpm for 10 minutes. The liquor was then filtered with a filter paper (NO 5-C by JIS standards).

Comparative Example

A gas liquor as shown in Table 3 below was treated using the same procedures as in the above Example under the conditions shown in Table 3 below.

In the Comparative Example, the gas liquor was immediately subjected to an activated sludge treatment after the pretreatment step, and then subjected to the post-treatment step.

The results obtained in the Example and Comparative Example are also shown in Table 3 below.

Table 3

| | Example | Comparative Example |
|---|---|---|
| Pretreatment Step | Ammonia stripping and pH adjustment | Ammonia stripping and pH adjustment |
| Raw Waste Gas Liquor | | |
| pH | 9.5 | 9.5 |
| BOD$_5$ (ppm) | 2960 | 2830 |
| COD$_{Mn}$ (ppm) | 4500 | 4300 |
| SCN Compounds (ppm) | 680 | 655 |
| CN Compounds (ppm) | 30 | 25 |
| Phenols (ppm) | 1020 | 980 |
| NH$_3$ (ppm) | 3100 | 3300 |
| Biological Treatment Steps | | |
| Influent Gas Liquor | | |
| pH | 6.1 | 6.5 |
| BOD$_5$ (ppm) | 1850 | 1700 |
| COD$_{Mn}$ (ppm) | 3000 | 3000 |
| SCN Compounds (ppm) | 670 | 650 |
| CN Compounds (ppm) | 20 | 20 |
| Phenols (ppm) | 622 | 500 |
| NH$_3$ (ppm) | 810 | 450 |
| First Biological Treatment Step | Fixed bed type biological treatment | — |
| Conditions | | |
| COD Volume Load (kg/m$^3$ · D) | 7.2 | |
| COD Surface Area Load (g/m$^2$ · D) | 327 | — |
| Aeration Time (hours) | 10 | |
| Effluent Gas Liquor | | |
| pH | 6.7 | |
| BOD$_5$ (ppm) | 300 | |
| COD$_{Mn}$ (ppm) | 1270 | |
| SCN Compounds (ppm) | 580 | — |
| CN Compounds (ppm) | 18 | |
| Phenols (ppm) | 10 | |
| Second Biological Treatment Step | Treatment with activated sludge and activated carbon | Activated sludge |

Table 3-continued

| | Example | Comparative Example |
|---|---|---|
| Conditions | | |
| COD Volume Load (kg/m$^3$ . D) | 1.27 | 1.0 |
| COD-SS Load (kg/kg . D) | 0.31 | 0.25 |
| Sludge Concentration (ppm) | 4100 | 3950 |
| Activated Carbon Concentration (ppm) | 39000 | — |
| Amount of Activated Carbon Added (ppm) | 1600 (regenerated: 1520 fresh: 80) | — |
| Aeration Time (hours) | 12 | 36 |
| Effluent Gas Liquor | | |
| BOD$_5$ (ppm) | 3.8 | 30 |
| COD$_{Mn}$ (ppm) | 20 | 350 |
| SCN Compounds (ppm) | 0.01 (trace) | 40 |
| CN Compounds (ppm) | 15 | 18 |
| Phenols (ppm) | 0.01 (trace) | 5 |
| Post Treatment Step | Flocculation and precipitation, and filtering through sand | |
| Effluent Gas Liquor | | |
| BOD$_5$ (ppm) | less than 2 (trace) | 20 |
| COD$_{Mn}$ (ppm) | 12 | 115 |
| SCN Compounds (ppm) | less than 0.1 (trace) | 40 |
| CN Compounds (ppm) | 0.6 | 0.8 |
| Phenols (ppm) | less than 0.01 (trace) | 0.5 |
| Total Aeration Time in Biological Treatment Steps (hours) | 22 | 36 |

Ratio of Sludge Returned: 100% by volume based on the raw waste gas liquor volume.
COD Volume Load: COD of the influent liquor per day per cubic meter in the aeration tank.
COD Surface Area Load: COD of the influent liquor per day per square meter of the filling material in the aeration tank.
COD-SS Load: COD of the influent liquor per day per kilogram of suspended solids in the aeration tank.

In the above Example, the gas liquor was treated in the same way except using ferrous sulfate and ferric sulfate instead of the ferrous chloride and ferric chloride. The treating conditions and the results obtained are shown in Table 4 below together with the results obtained in the case of using iron chlorides.

Table 4

| Coagulating-Sedimenting Step | Iron Chlorides | Iron Sulfates |
|---|---|---|
| Conditions | | |
| Ferrous Salt (ppm) | 200 | 300 |
| As Fe (ppm) | 88 | 84 |
| pH (using NaOH) | 8.5 | 8.4 |
| Ferric Salt (ppm) | 100 | 150 |
| As Fe (ppm) | 34 | 55 |
| Influent Liquor (effluent liquor from the second biological treatment step) | | |
| COD$_{Mn}$ (ppm) | 20 | 22 |
| BOD$_5$ (ppm) | 3.8 | 4.7 |
| SCN Compounds (ppm) | less than 0.01 (trace) | less than 0.01 (trace) |
| CN Compounds (ppm) | 15 | 1.3 |
| Phenols (ppm) | less than 0.01 (trace) | less than 0.01 (trace) |
| Effluent Liquor from the Coagulating-Sedimenting Step | | |
| COD$_{Mn}$ (ppm) | 12 | 14 |
| BOD$_5$ (ppm) | less than 2 (trace) | less than 2 (trace) |
| SCN Compounds (ppm) | less than 0.01 (trace) | less than 0.01 (trace) |
| CN Compounds (ppm) | 0.6 | 0.7 |
| Phenols (ppm) | less than 0.01 (trace) | less than 0.01 (trace) |

All values in Table 4 were measured in the same manner as in Table 1.

While the invention has been described in detail and with reference to specific embodiments thereof, it will be apparent to one skilled in the art that various changes and modifications can be made therein without departing from the spirit and scope thereof.

What is claimed is:

1. A method for treating a gas liquor discharged from the quenching of a coke oven gas, the gas liquor containing ammonia, phenols, thiocyanate compounds, cyanide compounds, suspended solids and oils, which comprises the steps of
   (A) reducing the ammonia content of the gas liquor to about 1,000 ppm or less;
   (B) subjecting the gas liquor from step (A) to a first biological treatment comprising treating the gas liquor treated in step (A) with microorganisms;
   (C) subjecting the gas liquor treated in step (B) to a second biological treatment comprising treating the gas liquor treated in step (B) in an aeration tank including a mixture of suspended solids comprising powdered activated carbon and activated sludge mixed with the gas liquor; and
   (D) adding an iron salt to the gas liquor from step (C) to cause a coagulation and a sedimentation.

2. The method of claim 1, wherein the content of ammonia in the gas liquor is reduced to 800 to 1,000 ppm in step (A).

3. The method of claim 1, wherein the COD$_{Mn}$ of the gas liquor is reduced by 30 to 90% in step (B).

4. The method of claim 1, wherein the treatment in step (B) is carried out in a suspension-type aeration tank in which the concentration of activated sludge is about 2,000 to about 5,000 ppm, the pH is about 6.0 to about 7.5, the amount of dissolved oxygen is about 1 to about 5 ppm, and the temperature is about 25 to about 35° C.

5. The method of claim 1, wherein the treatment in step (B) is carried out in a fixed bed reaction type aeration tank in which the volume load is about 4 to about 8 kg $COD_{Mn}/m^3$ day, the surface area load is about 200 to about 400 g $COD_{Mn}/m^2$ day, the pH is about 6.0 to about 7.5, the amount of dissolved oxygen is about 2 to about 7 ppm, and the temperature is about 25 to about 35° C.

6. The method of claim 1, wherein the activated carbon used in step (C) has a particle size of about 150 to about 400 mesh.

7. The method of claim 1, wherein in step (C), the amount of activated sludge is about 2,000 to about 5,000 mg/liter, the amount of activated carbon is about 10,000 to about 50,000 mg/liter, and the weight ratio of activated sludge to activated carbon is about 1:2 to about 1:20.

8. The method of claim 1, wherein the treatment in step (C) is carried out at a temperature of about 20 to about 40° C. and a pH of about 6 to about 7.5 while maintaining the amount of dissolved oxygen at about 2 to about 6 ppm.

9. The method of claim 1, wherein in step (D), a ferric salt is added to the gas liquor, and the pH of the gas liquor is adjusted to about 5 to about 7 with an alkali, thereby to sediment cyanide ion as Berlin blue.

10. The method of claim 9, wherein the ferric salt is $FeCl_3$ or $Fe_2(SO_4)_3$.

11. The method of claim 1, wherein step (D) comprises adding a ferrous salt to the gas liquor to convert cyanide ion in the gas liquor to a sediment of ferrous ferrocyanide and insoluble Turnbull's blue, adjusting the pH of the gas liquor to about 7.5 to about 9.5, and adding a ferric salt to the gas liquor to precipitate $[Fe(CN)_6]^{4-}$ in the liquor produced on adjustment of pH as insoluble Berlin blue.

12. The method of claim 11, wherein the ferrous salt is $FeCl_2$ or $FeSO_4$, and the ferric salt is $FeCl_3$ or $Fe_2(SO_4)_3$.

13. The method of claim 11, wherein the amount of the ferrous salt is such that the $Fe^{II}$ in the salt is within the range shown by $x'$ calculated by the following equations, $$y = 0.213x - 3.8$$

$$x' = x \pm 25 \text{ mg/l}$$

wherein y is the concentration in mg/l of cyanide ion in the influent liquor, x is the amount in mg/l of $Fe^{II}$ in the ferrous salt, and the amount of the ferric salt is determined such that the $Fe^{III}/Fe^{II}$ weight ratio is about 0.5 to 3.

14. The method of claim 1, wherein the method includes recovering the activated carbon used in step (C), regenerating the recovered activated carbon and recycling the activated carbon.

15. The method of claim 14, wherein said regeneration treatment of said activated carbon is carried out by a wet air oxidation method.

16. The method of claim 1, wherein the precipitate produced by adding the ferrous salt is separated and removed from the gas liquor before the adjustment of the pH.

* * * * *